(12) United States Patent
Prodoehl et al.

(10) Patent No.: US 11,956,320 B2
(45) Date of Patent: *Apr. 9, 2024

(54) APPARATUS AND METHOD FOR CLIENT CONNECTION ESTABLISHMENT (71) Applicant: Connectify, Inc., Philadelphia, PA (US)

(72) Inventors: Brian Prodoehl, Plymouth Meeting, PA (US); Kevin Cunningham, Swarthmore, PA (US); Brian Lutz, Philadelphia, PA (US); Alexander Gizis, Philadelphia, PA (US)

(73) Assignee: CONNECTIFY, INC., Philadelphia, OR (US)

( * ) Notice: Subject to any disclaimer, the term of this patent is extended or adjusted under 35 U.S.C. 154(b) by 15 days.

This patent is subject to a terminal disclaimer.

(21) Appl. No.: 17/727,310

(22) Filed: Apr. 22, 2022

(65) Prior Publication Data
US 2022/0247821 A1 Aug. 4, 2022

Related U.S. Application Data (63) Continuation of application No. 17/071,651, filed on Oct. 15, 2020, now Pat. No. 11,368,535.
(Continued)

(51) Int. Cl.
H04L 67/141 (2022.01)
H04L 12/46 (2006.01)
(Continued)

(52) U.S. Cl.
CPC ........ H04L 67/141 (2013.01); H04L 12/4641 (2013.01); H04L 67/01 (2022.05); H04L 67/56 (2022.05)

(58) Field of Classification Search
CPC ....... H04L 57/141; H04L 57/01; H04L 57/56; H04L 12/4641
See application file for complete search history.

(56) References Cited

U.S. PATENT DOCUMENTS

| 7,406,523 B1* | 7/2008 | Kruy | H04L 67/14 709/227 |
| 10,341,468 B2* | 7/2019 | Hala | H04L 12/66 |

(Continued)

OTHER PUBLICATIONS

Briscoe et al., "Reducing Internet Latency: A Survey of Techniques and Their Merits", IEEE Communication Surveys & Tutorials, vol. 18, Issue :3, Nov. 26, 2014.*

(Continued)

Primary Examiner — Todd L Barker
(74) Attorney, Agent, or Firm — Kamran Emdadi (57) ABSTRACT Connecting a client computer to a server may include receiving a first request at the server from the client computer for content managed by the server, and the first request includes a communication protocol and is sent from a first access point, receiving a second request at the server from the client computer for the content managed by the server, and the second request is transmitted from a second access point prior to the server responding to the first request and includes a different communication protocol than the first request, determining by the server the first request and the second request share a common attribute, transmitting a connection acceptance message from the server to the client computer identifying a selected one of the first request and the second request based on a most optimal connection associated with the selected request, and establishing a connection between the server and the client computer based on the selected request.

20 Claims, 4 Drawing Sheets

Related U.S. Application Data (60) Provisional application No. 62/936,748, filed on Nov. 18, 2019.

(51) Int. Cl.
  *H04L 67/01* (2022.01)
  *H04L 67/56* (2022.01)

(56) References Cited

U.S. PATENT DOCUMENTS

| | | |
|---|---|---|
| 10,581,854 B2 | 3/2020 | Han et al. |
| 2003/0097448 A1 | 5/2003 | Menezes et al. |
| 2004/0249948 A1 | 12/2004 | Sethi et al. |
| 2006/0075114 A1 | 4/2006 | Panasyuk et al. |
| 2008/0126510 A1 | 5/2008 | Golobrodsky et al. |
| 2010/0312899 A1 | 12/2010 | Herzog et al. |
| 2011/0153831 A1 | 6/2011 | Mutnuru et al. |
| 2012/0079122 A1 | 3/2012 | Brown et al. |
| 2012/0331160 A1 | 12/2012 | Tremblay et al. |
| 2013/0060842 A1 | 3/2013 | Grossman |
| 2013/0198262 A1 | 8/2013 | Troel |
| 2013/0227148 A1 | 8/2013 | Zu et al. |
| 2013/0332511 A1* | 12/2013 | Hala ............ H04L 67/34 709/228 |
| 2014/0092779 A1 | 4/2014 | Seok et al. |
| 2015/0113591 A1 | 4/2015 | Feng et al. |
| 2015/0163194 A1 | 6/2015 | Carriere |
| 2015/0249639 A1 | 9/2015 | Onno et al. |
| 2016/0080529 A1 | 3/2016 | Lin et al. |
| 2016/0315923 A1 | 10/2016 | Riscombe-Burton et al. |
| 2016/0359786 A1 | 12/2016 | Jhaveri et al. |
| 2017/0311367 A1 | 10/2017 | Ursitti et al. |
| 2018/0167475 A1 | 6/2018 | Agarwal et al. |
| 2018/0176949 A1 | 6/2018 | Islam et al. |
| 2018/0191897 A1 | 7/2018 | Parker et al. |
| 2019/0363974 A1 | 11/2019 | Wang et al. |
| 2020/0099772 A1 | 3/2020 | Ray et al. |
| 2020/0366740 A1 | 11/2020 | Gwock et al. |

OTHER PUBLICATIONS

D. Schinazi, et al., Happy Eyeballs Version 2 (IETF RFC 8305), Dec. 2017.

* cited by examiner

APPARATUS AND METHOD FOR CLIENT CONNECTION ESTABLISHMENT

BACKGROUND

The ability to easily communicate over computer networks has enabled rapid expansion and growth in data technology. Central to that growth is the ability of a computing device, typically referred to as the client (or client computer) to communicate over one or more networks with another computing device, typically referred to as the server. In this manner, the client can transmit data to and receive data from the server. In some examples, the server is simply downloading large quantities of data (e.g. video streaming) to the client. In other scenarios, the server is acting as an intermediary between two clients to allow communication therebetween.

An important aspect of client/server interaction is the ability of the client to connect with the server so that communication may occur. In one example, a client connects with a local area network (LAN) which in turn is connected to a wide area network such as the Internet. The Internet is then connected to the server through some form of connection which may be either direct (Ethernet) or indirect (via another local area network, for example).

Various technologies are known for connecting the client device with the LAN (in many situations, but particularly when the client device is mobile or wireless). Cellular technology is often (but not always) accessible, and even when a cellular signal is available, it may not be the most desirable form of connection. In some situations, cellular communication can become extremely expensive, particularly when roaming occurs. Also, cellular communication may not always be reliable. Furthermore, a signal from a cellular provider may be weak or nonexistent depending upon geographic location. Thus, a cellular user may prefer other forms of connection in certain situations.

An alternative to cellular connection is Wi-Fi. Wi-Fi provides a wireless local area network (WLAN), a type of LAN. A hotspot is a physical location served by an access point that provides wireless connectivity to the WLAN.

While Wi-Fi connection to a LAN may not always be available, when it is available it can have significant advantages over cellular. Many retailers and public facilities provide LAN service. Thus, for example, when entering a retail establishment in which cellular signals are weak, the public may be offered Wi-Fi communication that is strong, reliable, and often free.

Wi-Fi systems typically rely on a concept known as Service Set Identifier (SSID). SSID is the primary name associated with each wireless LAN. In accordance with the 802.11 standard, Wi-Fi networks (and more specifically access points such as routers) continuously transmit their respective SSIDs within wireless management beacon packets. The beacon packets are continuously transmitted over one or more radio frequencies to let client devices within wireless range know which wireless networks are available. Client devices then use any SSIDs that they receive to identify and possibly join respective wireless networks.

As a user with a modern smartphone enters the coverage area of one or more Wi-Fi networks (for example, walking from a location such as a car where only cellular communication is available to another location such as a retail location where Wi-Fi communication is available), the smartphone can display each SSID that it receives for the Wi-Fi network in the coverage area. Again, this occurs because Wi-Fi networks (and in particular their access points or routers) routinely and repeatedly transmit their respective SSIDs within their respective coverage areas via management beacon packets. Any client device with Wi-Fi capability within a coverage area is typically able to receive the management beacon packets from the respective Wi-Fi network. In some cases, the smartphone will receive and display multiple SSIDs because it is in the coverage area of multiple Wi-Fi networks. The user of the client device can then select which Wi-Fi network to join by selecting the respective SSID (or select one SSID if only one SSID appears on the smartphone). Once a Wi-Fi network is selected, additional steps may be required to complete joining that network, such as the entering of a password, navigation with a captive portal, etc. After a user's client device has joined a Wi-Fi network, the respective SSID (and any associated password) may be retained by the client device. If the client device enters the coverage area of the Wi-Fi network again in the future, the smartphone can be programmed to automatically attempt to connect to that Wi-Fi network.

Other networks may also broadcast identifying data to let any communication devices in communication range know that the networks may be available for connection therewith. Exemplary networks include Facebook Terragraph, Google Loon, SpaceX Starlink and Amazon Kuiper.

When a client device such as a mobile device is within the coverage area of a Wi-Fi network, the client device typically defaults to using that Wi-Fi network—instead of using an available cellular network. This preference may be due to the greater cost of using a cellular network, compared to the lower cost (or no cost) of a Wi-Fi network. This preference may also be due to the fact that in some areas where Wi-Fi coverage is available, the Wi-Fi signal may be stronger or more reliable than any available cellular signal. While such defaults are preferential, they may be disadvantageous as well. If, for example, the client device defaults to a Wi-Fi network instead of a cellular network, and the Wi-Fi network is not communicating with the Internet (e.g. disabled), the client device will now be totally lacking in Internet connectivity. As a result, client device communication with an intended destination is not possible. A user in such a situation may be described as connected to a "dead hotspot." This can be a very frustrating situation, necessitating the user to manually disconnect from the Wi-Fi network so that Internet communication can proceed over an available cellular network.

Even if the Wi-Fi network is communicating with the Internet, there may be other reasons why a client device is not communicating with its intended destination. For example, some Wi-Fi networks ban the use of UDP protocol. UDP protocol is commonly used for video streaming. Therefore, some Wi-Fi networks prohibit UDP protocol in order to avoid the overhead and congestion that results from video streaming. If the user thus wishes video streaming, and if by default the user's client device is connected to a Wi-Fi network that prohibits UDP protocol, the user will be unable to video stream with his device while the connection with the network remains. In such a scenario, if the user is willing to pay the cost of cellular data (or if cellular data is affordable, as part of an unlimited data plan for example), it would be preferred for the user's client device to be connected to a cellular network (instead of a Wi-Fi network banning UDP protocol) so that the user may stream video on his client device.

While Wi-Fi is a very common form of wireless communication, other forms of communication are known as well, including Bluetooth and satellite.

With regard to DNS queries, it is known that an IPv4 query cannot be successfully resolved over a network that is limited to IPv6 protocol. It is also known that IPv6 is not backwards compatible with IPv4. Thus, RFC 8305 ("Happy Eyeballs") proposes that a DNS query be transmitted using both IPv4 and IPv6, to determine which protocol is available on a specific network.

An alternative to DNS is DoH (DNS over HTTPS). This protocol is for performing remote Domain Name System (DNS) resolution via the HTTPS protocol. A proposed standard RFC 8484 has been published by the IETF. DNS can also be performed over TLS, and this protocol is known as DoT. DoT protocol has been published as RFC 7858 and RFC 8310. Both DoH and DoT encrypt DNS requests.

SUMMARY

A method of connecting a client computer to a server comprises the steps of: transmitting a first request from the client computer to the server for the server to communicate with the client computer; transmitting a second request from the client computer to the server for the server to communicate with the client computer, the second request transmitted from the client computer to the server before the client receives a response to the first request; wherein the client computer transmits the first request and the second request with more than one kind of difference between the first request and the second request, wherein the more than one kind of difference effects content of the first request and the second request, respectively; and communicating between the client computer and the server depending upon whether communication based on the first request or the second request is established.

Another example embodiment may include connecting a client computer to a server by receiving a first request at the server from the client computer for content managed by the server, and the first request includes a communication protocol and is sent from a first access point, receiving a second request at the server from the client computer for the content managed by the server, and the second request is transmitted from a second access point prior to the server responding to the first request and includes a different communication protocol than the first request, determining by the server the first request and the second request share a common attribute, transmitting a connection acceptance message from the server to the client computer identifying a selected one of the first request and the second request based on a most optimal connection associated with the selected request, and establishing a connection between the server and the client computer based on the selected request.

DETAILED DESCRIPTION

Figure 1:
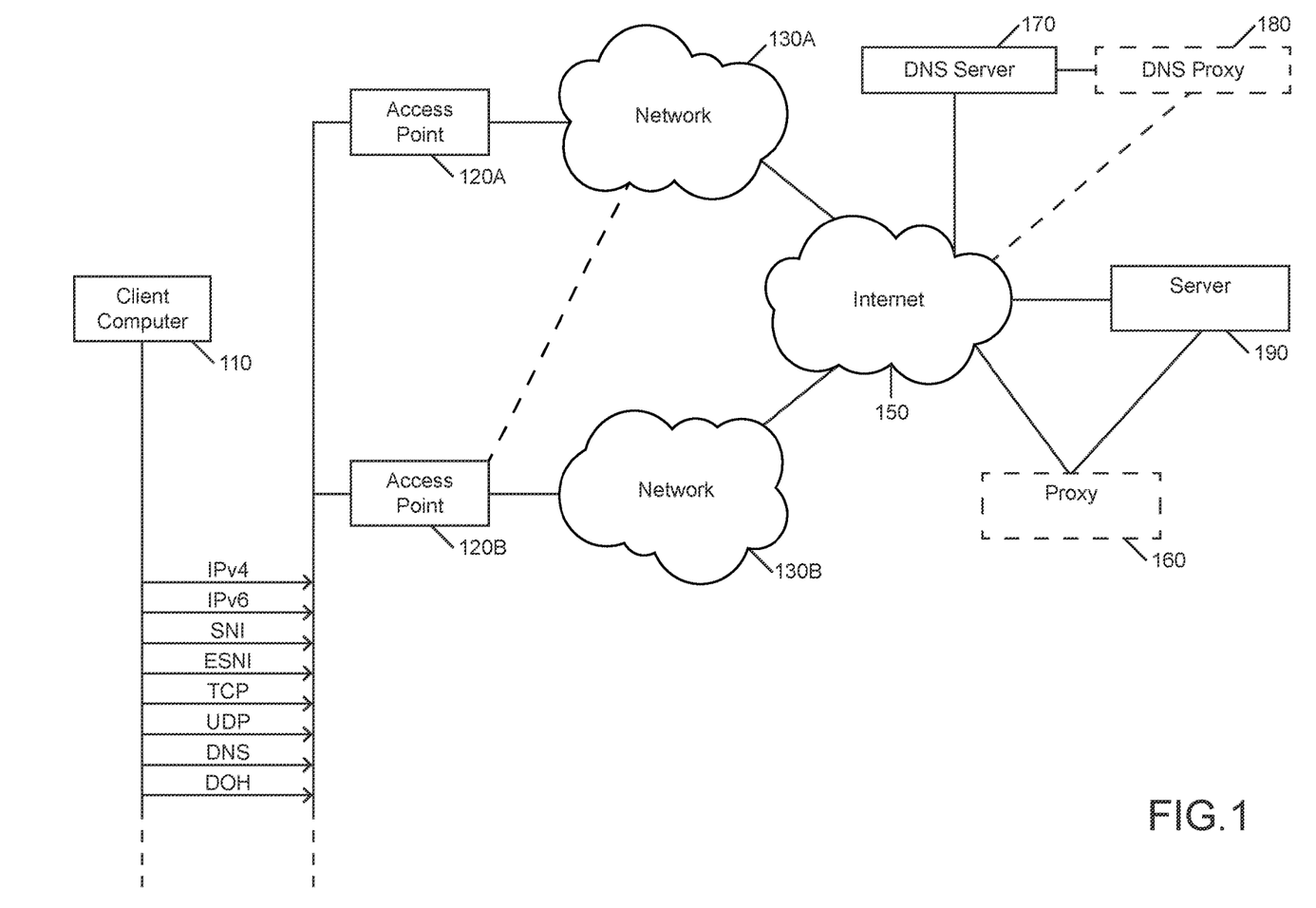
FIG. 1 is a block diagram that illustrates a client computer and a server communicating with each other in accordance with an exemplary embodiment of the present invention.

FIG. 1 is a block diagram that illustrates an exemplary embodiment of the present invention. In FIG. 1, client computer 110 wishes to communicate with server 190. Client computer 110 communicates with server 190 under at least two scenarios.

In a first scenario, client computer 110 knows the IP address of server 190 and communicates with server 190 by accessing the IP address associated with server 190.

In a second scenario, client computer 110 knows a URL associated with server 190 but must first transmit a DNS query in order to obtain the IP address of server 190 that corresponds to the URL. Once the IP address of server 190 is known, client computer 110 can then access server 190 via its IP address. There may be further additional scenarios by which client computer 110 and server 190 communicate.

In the first scenario, server 190 is coupled to Internet 150. Client computer 110 desires to communicate with server 190 via Internet 150. In order to "reach" Internet 150, client computer 110 needs to reach a network that is coupled to Internet 150. In order to reach that network, client 110 needs to reach an access point associated with that network.

In one exemplary embodiment of the present invention, client computer 110 can communicate with one or more access points. As shown in FIG. 1, client computer 110 may be able to communicate with access point 120A. Alternatively, or in addition, client computer 110 may be able to communicate with access point 120B. Any of the access point shown may be used for accessing, for example, a cellular network. Any of the access point shown may be used for accessing, for example, an alternative to a cellular network such as a Wi-Fi network. In one example, more than one access point may be used for communicating with a common (single) network. The multiple access points may be located, for example, in geographically distinct locations. As an alternative, multiple access points may be owned and/or operated by respectively different cellular phone providers, and thus be coupled to respective cellular networks. In a further embodiment, multiple access points are associated with respectively different Wi-Fi networks. In another embodiment, multiple access points may be associated with a common (single) network, but each access point may be designed to process data in respectively different formats (e.g. encrypted and non-encrypted). In another embodiment, each access point is associated with a network that operates with a respectively different communications technology (e.g. cellular, Wi-Fi, Bluetooth, satellite, etc.). The above description is merely exemplary. It is understood that there can be many differences between the access points and/or their respective networks and/or the respective data they carry.

In actual operation, when client computer 110 wishes to communicate with server 190, it may not be known whether any one (or more than one, or all) access point(s) within wireless range may be used to communicate with server 190. The unavailability of an access point to be used for client computer 110 to communicate with server 190 may be due to a variety of reasons. An exemplary list of reasons includes the following:

1) the access point is nonfunctional;
2) the signal received from the access point by the client computer (or vice versa) is not strong enough to enable dependable communication;
3) the signal received from the access point by the client computer (or vice versa) is receiving interference and dependable communication is not possible;

4) client computer 110 is transmitting a DNS request and the access point has been programmed to refuse all (or certain) DNS requests.
5) client computer 110 has transmitted a signal that is not a DNS request and the access point has been programmed to reject such a request;
6) the IP address that client computer 110 is requesting has been blocked;
7) client computer 110 has transmitted an HTTPS request, and some HTTPS requests are automatically blocked, based on the contents of the SNI field of the request headers;
8) client computer 110 desires to communicate using TCP and TCP is blocked;
9) client computer 110 desires to communicate using UDP and UDP is blocked;
10) client computer 110 desires to communicate using IPv4 and the access point (and/or network) is only configured for IPv6;
11) client computer 110 desires to communicate using IPv6 and the access point is only configured for IPv4.

The above list merely includes examples of one or more reasons why communication over a particular access point may not be possible. The one or more reasons why communication is not possible can be placed into categories. Some of the categories of reasons why an access point may not provide communication between a client and a server may include electrical problems, software problems, addressing issues, incompatible protocols, incompatible network connections, permissions to communicate over various networks, communication problems, etc. An inability to communicate with a server may be due to one or more than one of the items on the foregoing list.

The above explanation may refer to a situation where the client computer is aware of only one access point. Alternatively, the above explanation may refer to a situation where the client computer is aware of more than one access points. "Aware" may mean, for example, that the client computer is within wireless range of one or more access points. "Aware" may also mean that the client computer is receiving SSID from the one or more access points. It is known that SSID may be missing from management beacon packets in order to conceal the name of a network (or access point connected thereto). One of ordinary skill in the art knows that it is possible to intercept handshaking between a client computer and an access point in order to identify that access point's SSID. Alternatively, a user may know an access point's hidden SSID through prior arrangement. Thus, there are multiple ways in which it is possible to become aware of being within wireless range to one or more access points.

In accordance with the above, client computer 110 tries different methods to communicate with server 190. In one embodiment, client computer 110 makes multiple attempts to communicate with server 190, such that there are differences in the way the attempts occur. In other words, there may be two attempts for client computer 110 to communicate with server 190 and there may be one difference (e.g. DNS vs. DoH or DoT, SNI vs. ESNI, one access point vs. another access point, etc.) in how the two attempts occur, Or, there may be more than one difference in how the two attempts occur. Alternatively, there may be more than two attempts for client computer 110 to communicate with server 190 and there may be one difference in how the more than two attempts occur. Or, there may be more than one difference in how the two attempts occur.

When client computer 110 communicates with access point 120A, access point 120B, etc., there may be several results as a result of those communications. For example, before the communication occurs, client computer 110 may not know whether any access point will provide connectivity to server 190. Alternatively, client computer 110 may not know which access point provides connectivity to server 190. Alternatively, client computer 110 may not know which access point is the best access point for providing connectivity with server 190. ("best" may refer to signal strength, interference, protocol, security, etc.)

Client computer 110 can attempt to communicate with server 190 in several ways. In one scenario, client computer 110 merely requests that an access point provide connectivity with server 190. In another scenario, client computer 110 requests connectivity through a specific access point to server 190 and, before receiving a response from that access point, also sends a specific message and/or requests a specific response from server 190. The second scenario may have an advantage over the first scenario. In the second scenario, if an access point does indeed provide connectivity with server 190, server 190 can act on the specific request and immediately begin to provide the requested response (e.g. data) to client computer 110. Again, this may be preferable to the first scenario that divides the operation of obtaining data from server 190 into several steps.

In summary, a request for connectivity between client computer 110 and server 190 may proceed as follows:
1) request that an access point provide connectivity with server 190;
2) the access point responds (to the client computer) and confirms that connectivity is available;
3) client computer 110 makes a specific data request;
4) server 190 fulfills the request of client computer 110 via the access point that provided the response in step 2

As an alternative, a request for connectivity between client computer 110 and server 190 may proceed as follows:
1) request, for an access point, a specific response from server 190. The specific response may be, for example, that server 190 provide certain data as a discreet event, that server 190 begin to stream audio and/or video, etc.
2) server 190 successfully provides the response that is received by client computer 110 via the access point over which the request was made.

In scenario 2, if an access point allows connectivity between client computer 110 and server 190, the actual response from server 190 that client computer 110 is requesting is received by client computer 110 much faster than in the first scenario.

Note a significant difference between scenario 1 and scenario 2 above. In scenario 1, client computer 110 is requesting connectivity with server 190, but is not requesting specific data from server 190 until client computer 110 is advised that connectivity is established. In scenario 2, client computer 110 is requesting connectivity with server 190, and at substantially the same time is requesting specific data from server 190 (i.e. the request for specific data is transmitted from client computer 110 before client computer 110 is informed that connectivity with server 190 is established). Again, by making a request for specific data without waiting to learn whether connectivity is established, the data is transmitted from server 190 to client computer 110 sooner. Note also that multiple connectivity requests (with the "one difference" or "more than one difference" outlined above) may be transmitted from client computer 110 with requests for specific data from server 190 included. If a connectivity request is not successful than the accompanying request for specific data is simply ignored. If multiple connectivity requests are transmitted from client computer 110 (with specific data requests) hopefully one of those requests will be successful and client computer 110 will receive the requested data from server 190.

When client computer transmits any request to an access point (for connectivity, specific data from server 190, etc.), there may be several possible results:

Connectivity is established but for some reason the requested data is not received (e.g. because it is password protected, the data is not stored on the designated server, etc.);

Connectivity is established and the requested data is received by client computer 110;

Client computer 110 receives an error message;

Client computer 110 receives no response (which may be interpreted after a certain time period has elapsed that connectivity is unavailable).

The "Happy Eyeballs" specification (RFC 8305) describes a scenario in which a data connection is evaluated for transmission using the IPv4 and IPv6 addressing standards. In the "Happy Eyeballs" specification, a DNS query is sent via IPv4 and the same DNS query is sent nearly simultaneously (i.e. serially, but immediately after the IPv4 query is sent) via IPv6. Happy Eyeballs either waits to see which query elicits the first response, or waits for a predetermined number of milliseconds after receiving an IPv4 response to see if a preferred IPv6 response will be received. This strategy may be useful when dealing solely with a DNS query and for evaluating IPv4 versus IPv6, but today, there may be many reasons why access to a server via an access point may be blocked (as illustrated by the above list). Happy Eyeballs is only able to evaluate one difference in the protocol being used to communicate with the server (i.e. IPv4 vs. IPv6). It would be advantageous, however, if multiple criteria (or other criteria) could be evaluated in order to determine over which access point, or by using which protocol, or based on some other feature, communication with a server may occur. Happy Eyeballs did not contemplate such a solution. Again, those differences may be as follows:

SNI versus encrypted SNI ( );
different forms of encryption;
encryption versus non-encryption;
IPv4 vs IPv6;
DNS versus DoH;
TCP versus UDP In addition, one access point may be preferable to use over another access point based on issues such as signal strength, signal interference, cost, modulation scheme, etc.

In addition, as optionally shown in FIG. 1, two access points may be used for accessing two networks, respectively, or for both accessing one network. In the latter situation, the two access points may be different in some manner, such as physical location, protocol available, etc. The above list is merely exemplary.

While in one embodiment requests for server connection (with or without data requests, streaming requests, etc.) via one or more access points are performed by varying one item (which may or may not be on the above list), in a further embodiment, requests for server connection via one or more access points are performed by varying more than one item (which may or may not be on the above list).

As an example, and with reference to FIG. 1, the differences between multiple server connection attempts to a server with an IP address known to client computer 110 can be 1) using TCP for one connection attempt and UDP for another connection attempt; and 2) doing so on both access point 120A and access point 120B. In this manner, there are two differences between server connection attempts, namely, whether TCP or UDP is permitted for the server connection, and whether access point 120A or access point 120B is being used. Each access point, if capable of doing so, will then transmit to its respective networks 130A, 130B any request that is compatible with that access point. If the request reaches network 130A or network 130B, the request will be forwarded to Internet 150 and then to server 190.

If a request indeed reaches server 190 then server 190 can respond to the request if it is permitted to do so. For example, server 190 may be programmed to refuse to provide UDP streaming when UDP communication between client computer 110 and server 190 via a specific access point is prohibited (to avoid streaming congestion at that access point, for example). Furthermore, for example, if UDP streaming over the access point that successfully forwarded the request from client computer 110 is permitted, then UDP streaming can be sent from server 190 back to client computer 110 via that access point.

As an alternative, if client computer 110 transmits a request (for connectivity and/or data) to Access Point 120A, 120B in a manner that Access Point 120A, 120B cannot accept (or network 130A, 130B cannot accept, or that cannot be accepted elsewhere in FIG. 1), Access Point 120A can respond with an error message, or may simply not respond at all.

The access point and other communication attributes that ultimately results in a successful response to client computer 110 is the access point (and communication attributes) that client computer 110 can use immediately and/or in the future to communicate with server 190.

As another alternative, an access point may block a request for data from a specific IP address. For this reason, optional proxy 160 is included. Thus, a request for data can be transmitted by the IP address of server 190 and can also be transmitted via the IP address of proxy 160. In this manner, client computer 110 can receive data from which any data request (the request with the IP address of server 190 or the request with the IP address of proxy 160) garners the first successful response. In an alternative embodiment, client computer 110 ignores data from the second successful response if received within a predetermined time (from the first successful response). This alternative embodiment may be desirable if there are advantages to the manner in which the second successful response is received (e.g. better future communication, lower error rate, lower cost, etc.).

In all the above scenarios, if the request to communicate with server 190 also indicates the content that is desired from server 190, and if server 190 delivers that content, client computer 110 may have successfully received any data that client computer 110 requires, and further interaction between client computer 110 and any access point may be unnecessary (for the moment, at least).

FIG. 1 also shows DNS server 170 and optional DNS proxy 180. Client computer 110 may transmit a DNS query to DNS server 170 via one or more access points and with one or more additional differences in how the DNS query is transmitted. By transmitting a DNS query in a second manner (e.g. via a different access point, via a different protocol, etc.) without waiting to see if a successful response has been received from the first DNS query transmission, time is saved (versus the scenario where a first DNS query is sent, an attempt to obtain the IP address associated with a URL request is unsuccessful, and then a second DNS query is sent).

As shown in FIG. 1, DNS server 170 can also have a proxy 180. Thus, if a DNS query is sent to a blocked DNS server, the query can also be sent to DNS proxy 180. DNS proxy 180 may be a DNS database that can respond to the query, itself, or may behave as a server proxy that simply redirects the DNS query to DNS server 170 via the IP address of DNS proxy 180.

Figure 2A:
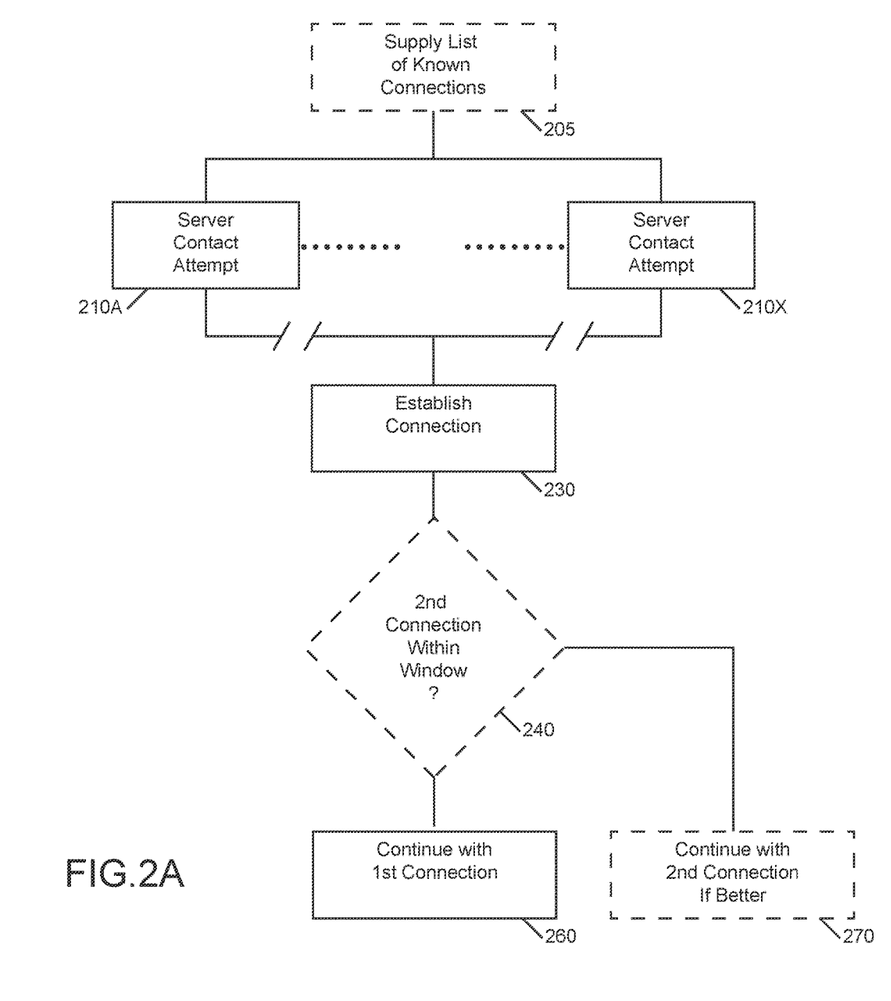
FIG. 2A is a flowchart diagram that illustrates exemplary steps by which a client computer and a server communicate with each other in accordance with an exemplary embodiment of the present invention.

FIG. 2A is a flow chart diagram that illustrates several exemplary embodiments of the present invention. In one embodiment, multiple requests (merely to connect, or to connect and receive data in response) are transmitted from client computer 110. As explained above, in one embodiment, there may be one difference between the plurality of requests. In another embodiment, there may be more than one difference (multiple differences) between the plurality requests. The differences are exemplified above and again may relate to, for example, IP address (and thus may optionally include the use of a proxy), protocol (which may include data protocol, encryption protocol, certificate protocol, addressing protocol, etc.), network connection (e.g. choosing from multiple access points), etc. At step 230, the first valid response received from the transmission requests is noted (and may result in the receipt of data from server 190) Alternatively at step 230 a connection is established between client computer 110 and server 190 for further communication. At step 260, any further optional communication may occur based on the results obtained in step 230.

FIG. 2A illustrates a further exemplary embodiment in which at step 240 an additional request for connection with server 190 (optionally with a request to receive data via server 190) is successful. This second (or subsequent) response (to a successful response to a further request) may be used (e.g. accepted) by client computer 110 if received within a predetermined period of time (for example), such as several milliseconds. To clarify, if the second (or subsequent) response to a transmission request is received within a predetermined period of the receipt of the response from the first request, the second (or subsequent) response may be used as the basis of further data communication (step 270) if the parameters relating to the second request provide more preferable communication then is available based on the parameters associated with the first received request. What those parameters may be can be, for example, predetermined.

Figure 2B:
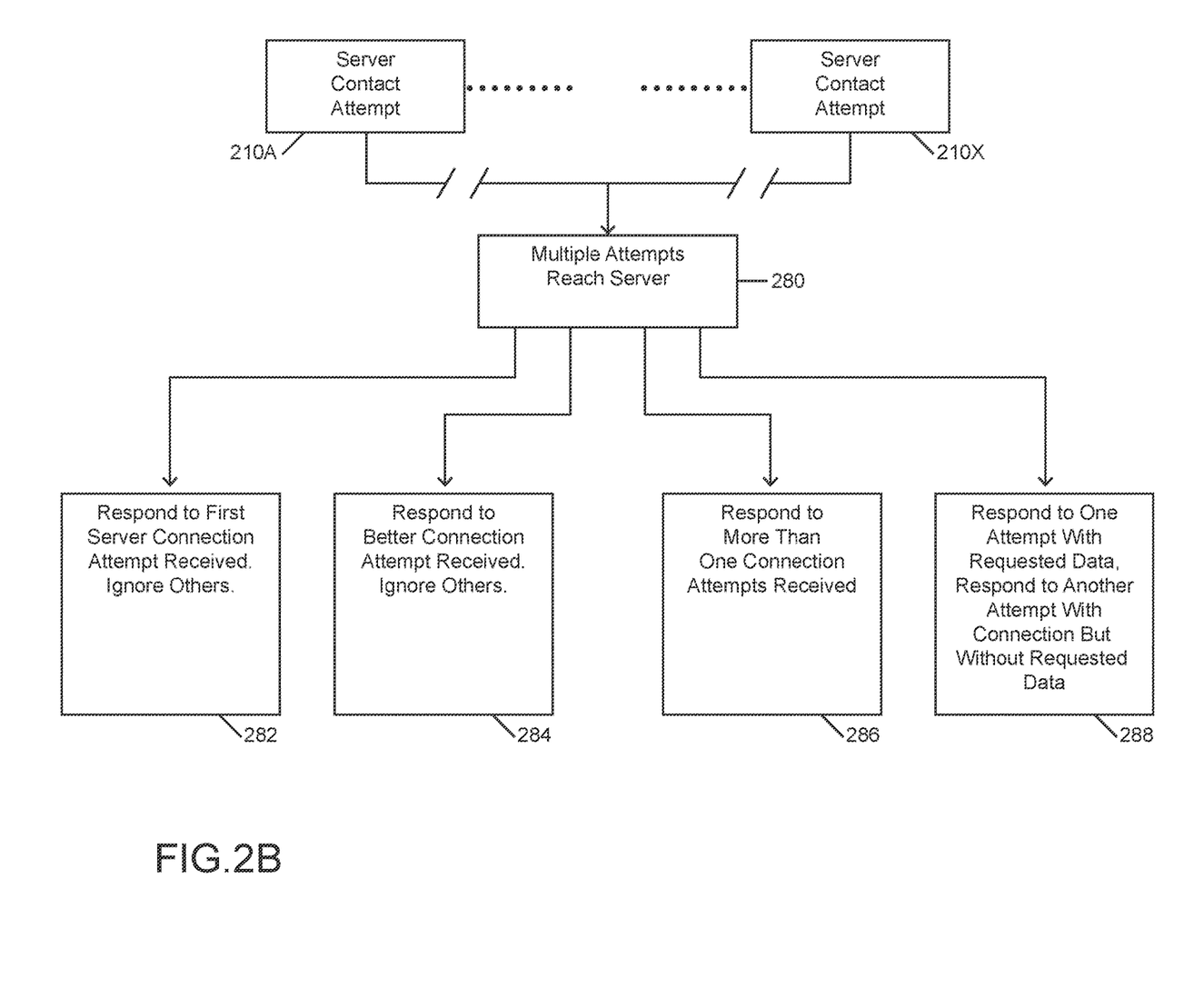
FIG. 2B is a flowchart diagram that illustrates further exemplary steps by which a client computer and a server communicate with each other in accordance with an exemplary embodiment of the present invention.

FIG. 2B illustrates a further exemplary embodiment of the present invention in which there are multiple server connection attempts (210A, . . . , 210X) from client computer 110 and more than one of those attempts are successful in reaching server 190 (step 280). Alternatively, there are multiple server connection attempts from client computer 110 that successfully reach server 190, and server 190 may be programmed to respond to any of those attempts if received by server 190 individually. The question then becomes, if multiple server connection attempts are received by server 190, how should server 190 respond to those multiple attempts? Several strategies may be available:

Server 190 may respond to the first server connection attempt it receives and ignore subsequent server connection attempts (optional step 282). Assume, for example, that client computer 110 attempts communication with server 190, and attempts communication multiple times, each time changing more than one aspect of the communication attempt. Assume also that the multiple (or more than) attempts are successfully received by server 190, and server 190 has the ability to respond to any of those multiple attempts if received individually. Server 190 determines that the multiple attempts are indeed identical attempts (e.g. client computer 110 is making the same attempts to communicate with server 190 but is changing more than one aspect of the attempt to find out which attempts will be successful). Determining that the attempts are identical occurs, for example, by server 190 determining that there is something identical to each attempt. In one embodiment, each attempt is comprised of data packets, and there is something common to the data packets of each attempt. Examples of "something common" include: 1) there is a payload in the packets the comprise each communication attempt, and contents of (at least a portion of) the payload are identical; 2) client computer 110 inserts a common token in each attempt, and server 190 detects the common token in multiple attempts that it receives; 3) some aspect of received connection attempts are similar, or substantially similar, such as a time stamp, IP address, etc. Note in the above example that a server connection attempt, as previously explained, may be a simple request to create a connection (i.e. channel) between client and server (with requests for specific data retrieval from the server separate and transmitted later), or the connection attempt may also include a request for the server to provide a specific response (such as data retrieval, video streaming, etc.).

Server 190 may successfully receive multiple server connection attempts (step 280) and server 190 responds to one of those server connection attempts that is in some way better than other connection attempts that it successfully receives (optional step 284). For example, if server 190 successfully receives a server connection attempt over a (paid) cellular network and a few milliseconds later server 190 successfully receives a server connection attempt over a (free) Wi-Fi network, server 190 may establish connection (and provide requested data to client computer 110) via the Wi-Fi network (and not the cellular network). Server 190 thus needs to recognize that the multiple server connection attempts are indeed redundant using, for example, one or more of the techniques described in paragraph 1) above. In this scenario, server 190 may include an algorithm for identifying all server connection attempts that it receives during a predetermined time period, and for choosing to respond to one such attempt according to a priority list. The chosen attempt may be responded to with a simple acknowledgement that a connection has been established, or may be responded to by providing data as (and if) requested at the time of the attempt.

Server 190 may successfully receive multiple server connection attempts (step 280) and server 190 responds to more than one of those attempts (with multiple respective connections, multiple respective responses that include specific data, etc.) (optional step 286). Such responsiveness may be useful in situations of redundancy, so that there is a backup source of data in the event that transmission errors occur (for example) in the transmission of a primary source of data.

Server 190 may successfully receive multiple server connection attempts (step 280) that all include the same specific data requests. Server 190 responds to one of those attempts (based, for example, on a list of attempts have respectively different characteristics, sorted by preference) (optional step 288). Server 190 may respond to one such attempt by providing requested data to client computer 110. Server 190 may respond to other such attempts by establishing connection with client computer 110 based on the attributes of the respective attempts, but by not responding to the specific data request that accompanied each of those attempts. In this manner, if the successful "connection" is disrupted, it is possible to immediately switch to one of the other connections without having to establish those connections after the disruption has occurred.

The above examples have included the examples of server 190 receiving multiple connection attempts. In one or more exemplary embodiments, server 190 is capable of determining that it has received multiple connection attempts that are duplicative. For example, server 190 may be able to detect that multiple connection attempts are duplicative because they are arriving from a common source IP address. For example, server 190 may be able to detect that multiple connection attempts are duplicative because of a unique common ID embedded in each of the multiple connection attempts (in the packet header, for example). In one or more exemplary embodiments, each connection attempt to server 190 is given a respectively different form of identification. In this manner, server 190 is able to respond to one connection request that reaches it, and to not respond (or reject) other responses that reach it, or that reaches it after one connection request reaches it. In another example, multiple connection requests reach server 190, but one connection request is accepted over others because the one connection request is "better" than others, meaning for example the latency is lower than others, the error rate is lower than others, etc. As a further example, when each connection attempt is given a respectively different form of identification, there are several ways that the different form of identification can be given. In one example, the different form of identification is that each connection attempt is assigned a respectively different source port number. In another example, the different form of identification is a unique identifier associated with each connection attempt. Such a unique identifier can be included, for example, in the packet header of the connection attempt. In another example, the unique identifier is randomly generated, although it is understood that this example is merely illustrative, and other methods of providing a unique identifier to multiple attempts are known.

The use of unique identifiers ensures that connection attempt and a response to the attempt are matched together. In other words, the use of unique identifiers allows server 190 to respond to a specific connection attempt. Also, the above examples enable server 190 to recognize when multiple connection attempts from a single source arrive. In this way, server 190 is able to respond to one connection attempt and to ignore the others (or optionally indicate that the other connection attempt(s) will not result in a connection being established).

The above examples have described communication (or attempted communication) between a client and server 190. It is understood that the communication may be between the client and a proxy to server 190.

The above examples and optional features provide technical advantages because a connection attempt with a server can be made without waiting for the results of a previous connection attempt. In this manner, connection is potentially established faster than waiting for the results of one connection attempt before making another connection attempt.

FIG. 2A also illustrates optional step 205 where transmission requests are based on a previously known list of connections. At step 205 the transmission requests from client computer 110 to access points are made based on connections (e.g. SSID) in that list. Alternatively, or in addition to step 205, available connections are newly discovered before steps 210A through 210X are executed.

Figure 3:
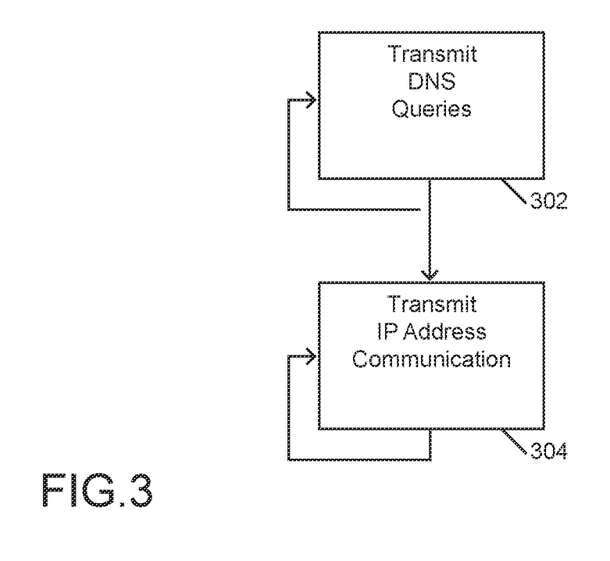
FIG. 3 is a flowchart diagram that illustrates operation of a further exemplary embodiment of the present invention.

FIG. 3 relates to three (or more) exemplary embodiments of the present invention. At step 302, a DNS query is made in multiple manners wherein there are multiple differences between the various DNS queries. The multiple DNS queries are made in accordance with the features illustrated in FIG. 1 and FIG. 2A. At step 304, an IP address is used for communicating with server 190. The IP address is used in multiple manners and there may be multiple differences between the manners in which the IP address is used. The multiple manners in which the IP address is used are in accordance with the features illustrated in FIG. 1, FIG. 2A, and FIG. 2B. In one embodiment, the features of step 302 are performed and the features of step 304 are not performed. In a second embodiment, the features of step 302 are not performed and the features of step 304 are performed. In another embodiment, the features of step 302 are performed, and after an IP address has been obtained from the DNS query, the features of step 304 are performed with that IP address.

A further exemplary embodiment of the present invention relates to the formation of a VPN depending upon which request for connection between the client computer and the server is successful first. In one embodiment, if two (or more) requests for formation of a VPN are transmitted from the client computer, with one (or more than one) difference (s) between the two requests, the VPN is established based on which of the requests results (first) in a successful response that is received by the client computer. In an alternative embodiment of the present invention, if the client computer receives a second successful response within a predetermined time that a first successful response is received, the VPN is formed based on the (preferred) attributes of the second successful response.

A further exemplary embodiment relates to which server is accessed with regard to any of the above exemplary embodiments, or aspects thereof. In one embodiment, FIG. 1 shows one server 190, but this merely exemplary, as multiple servers may be accessible to client computer 110. FIG. 1 also shows one DNS server 170, but this is merely exemplary, as multiple DNS servers may be accessible to client computer 110.

With regard to optional multiple servers 190 and/or optional multiple DNS servers 170, a further embodiment directs communication to different servers 190 and/or different DNS servers 170 depending upon protocol, format, and/or contents of the communication. In this manner, it is possible to determine how the server 190 and/or which DNS server 170 that responds to client computer 110 affects the speed with which client computer 110 receives a response (or the order in which client computer 110 receives a response, or whether any server provides a response to client computer 110). In one embodiment, when communication from client computer 110 occurs, and the communication is transmitted towards the servers, the communication is directed to one of the servers based on any content (or protocol, or format) in the communication. In another embodiment, the communication is directed to multiple servers, respectively, depending upon content (or protocol, or format) in the communication. As an example, IPv4 communication may be sent to one DNS server and IPv6 may be sent to another DNS server. In another embodiment, all the communication is sent to one server and all the communication is sent to another server. In any of the above exemplary embodiments, for example, the IP address of the destination server may be modified to send communication to a specific destination server. In other exemplary embodiments, packets may be encapsulated with IP addresses in order to send communication to a specific destination server.

The above explanation has been with regard to a client computer initiating communication with a server, but this is merely exemplary. In a further exemplary embodiment of the present invention, the server may initiate communication with the client computer. In such an exemplary embodiment, the communication from the server to the client computer may include multiple attempts to communicate and with one or more of the variations (e.g. network access, protocol, etc.) described above.

The above explanation has included multiple examples and multiple embodiments. It is understood to one of ordinary skill of the art that more than one of these examples and more than one of these embodiments can be combined in order to create further examples and embodiments.

The above explanation has described the use of DoH requests. It is understood that the above explanation can equally apply to DoT requests, as well as other types of encrypted DNS requests.

In an exemplary embodiment of the present invention a computer system may be included and/or operated within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system includes a processing device, a main memory (e.g., read-only memory (ROM), flash memory, dynamic random access memory (DRAM) (such as synchronous DRAM (SDRAM) or Rambus DRAM (RDRAM), etc.), a static memory (e.g., flash memory, static random access memory (SRAM), etc.), and a data storage device, which communicate with each other via a bus.

Processing device represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. Processing device is configured to execute listings manager logic for performing the operations and steps discussed herein.

Computer system may further include a network interface device. Computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

Data storage device may include a machine-readable storage medium (or more specifically a computer-readable storage medium) having one or more sets of instructions embodying any one or more of the methodologies of functions described herein. Data storage may also reside, completely or at least partially, within main memory and/or within processing device during execution thereof by computer system; main memory and processing device also constituting machine-readable storage media.

Machine-readable storage medium may also be used to store the device queue manager logic persistently. While a non-transitory machine-readable storage medium is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the aforementioned description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

The disclosure is related to an apparatus for performing the operations herein. This apparatus may be specially constructed for the required purposes or it may comprise a general-purpose computing device selectively activated or reconfigured by a computer program stored therein. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

The invention claimed is:

1. A method comprising:
   receiving a first request at a server from a client computer for content managed by the server, wherein the first request comprises a communication protocol and is sent from a first access point;
   receiving a second request at the server from the client computer for the content managed by the server, wherein the second request is transmitted from a second access point prior to the server responding to the first request and comprises a different communication protocol than the first request;
   determining by the server the first request and the second request share a common attribute;
   transmitting a connection acceptance message from the server to the client computer identifying a selected one of the first request and the second request based on a most optimal connection associated with the selected request; and
   establishing a connection between the server and the client computer based on the selected request.

2. The method of claim 1, wherein the common attribute is identified as a payload portion of the first request and a payload portion of the second request being the same.

3. The method of claim 1, wherein an IP address of the first request is different from an IP address of the second request.

4. The method of claim 1, wherein the connection is established over the most optimal connection of one of the first access point and the second access point.

5. The method of claim 1, wherein the most optimal connection is selected based on one or more of a determined lowest error rate and a lowest latency of the selected connection being lower than at least one other connection.

6. The method of claim 1, wherein the second request is transmitted from the client computer a predetermined period of time after the first request is sent and prior to the client computer receiving a response to the first request from the server.

7. The method of claim 1, wherein the first request and the second request comprise a request to establish a virtual private network (VPN) server connection.

8. A server comprising:
   a memory to store instructions; and
   a processor configured to process the instructions, wherein the processor is configured to
   receive a first request from a client computer for content managed by the server, wherein the first request comprises a communication protocol and is sent from a first access point;
   receive a second request from the client computer for the content managed by the server, wherein the second request is transmitted from a second access point prior to the server responding to the first request and comprises a different communication protocol than the first request;
   determine by the server the first request and the second request share a common attribute;
   transmit a connection acceptance message to the client computer identifying a selected one of the first request and the second request based on a most optimal connection associated with the selected request; and
   establish a connection between with the client computer based on the selected request.

9. The server of claim 8, wherein the common attribute is identified as a payload portion of the first request and a payload portion of the second request being the same.

10. The server of claim 8, wherein an IP address of the first request is different from an IP address of the second request.

11. The server of claim 8, wherein the connection is established over the most optimal connection of one of the first access point and the second access point.

12. The server of claim 8, wherein the most optimal connection is selected based on one or more of a determined lowest error rate and a lowest latency of the selected connection being lower than at least one other connection.

13. The server of claim 8, wherein the second request is transmitted from the client computer a predetermined period of time after the first request is sent and prior to the client computer receiving a response to the first request from the server.

14. The server of claim 8, wherein the first request and the second request comprise a request to establish a virtual private network (VPN) server connection.

15. A non-transitory computer readable storage medium configured to store instructions that when executed cause a processor to perform:
   receiving a first request at a server from a client computer for content managed by the server, wherein the first request comprises a communication protocol and is sent from a first access point;
   receiving a second request at the server from the client computer for the content managed by the server, wherein the second request is transmitted from a second access point prior to the server responding to the first request and comprises a different communication protocol than the first request;
   determining by the server the first request and the second request share a common attribute;
   transmitting a connection acceptance message from the server to the client computer identifying a selected one of the first request and the second request based on a most optimal connection associated with the selected request; and
   establishing a connection between the server and the client computer based on the selected request.

16. The non-transitory computer readable storage medium of claim 15, wherein the common attribute is identified as a payload portion of the first request and a payload portion of the second request being the same.

17. The non-transitory computer readable storage medium of claim 15, wherein an IP address of the first request is different from an IP address of the second request.

18. The non-transitory computer readable storage medium of claim 15, wherein the connection is established over the most optimal connection of one of the first access point and the second access point.

19. The non-transitory computer readable storage medium of claim 15, wherein the most optimal connection is selected based on one or more of a determined lowest error rate and a lowest latency of the selected connection being lower than at least one other connection.

20. The non-transitory computer readable storage medium of claim 15, wherein the second request is transmitted from the client computer a predetermined period of time after the first request is sent and prior to the client computer receiving a response to the first request from the server.

* * * * *